(12) United States Patent
Kim et al.

(10) Patent No.: US 12,308,471 B2
(45) Date of Patent: *May 20, 2025

(54) SEPARATOR HAVING NO SEPARATOR SUBSTRATE AND ELECTROCHEMICAL DEVICE INCLUDING THE SAME

(71) Applicant: LG ENERGY SOLUTION, LTD., Seoul (KR)

(72) Inventors: Min Ji Kim, Daejeon (KR); Kwan Woo Nam, Daejeon (KR); Kyung Ho Ahn, Daejeon (KR); Je An Lee, Daejeon (KR); Young Bok Kim, Daejeon (KR); Chul Haeng Lee, Daejeon (KR); Jung Hoon Lee, Daejeon (KR); Sol Ji Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/634,555

(22) Filed: Apr. 12, 2024

(65) Prior Publication Data
US 2024/0291106 A1 Aug. 29, 2024

Related U.S. Application Data

(62) Division of application No. 16/640,877, filed as application No. PCT/KR2018/013112 on Oct. 31, 2018, now Pat. No. 11,990,641.

(30) Foreign Application Priority Data

Oct. 31, 2017 (KR) .................. 10-2017-0143690
Oct. 30, 2018 (KR) .................. 10-2018-0131285

(51) Int. Cl.
*H01M 50/446* (2021.01)
*H01M 10/052* (2010.01)
*H01M 50/406* (2021.01)

(52) U.S. Cl.
CPC ....... *H01M 50/446* (2021.01); *H01M 10/052* (2013.01); *H01M 50/406* (2021.01)

(58) Field of Classification Search
None
See application file for complete search history.

(56) References Cited

U.S. PATENT DOCUMENTS

| | | |
|---|---|---|
| 6,183,901 B1 | 2/2001 | Ying et al. |
| 6,194,098 B1 | 2/2001 | Ying et al. |
| 6,277,514 B1 | 8/2001 | Ying et al. |
| 6,410,182 B1 | 6/2002 | Ying et al. |
| 6,423,444 B1 | 7/2002 | Ying et al. |
| 6,537,468 B1 * | 3/2003 | Hata ............ C08F 8/30 429/105 |
| 8,883,354 B2 | 11/2014 | Carlson et al. |
| 9,034,522 B2 | 5/2015 | Lee et al. |
| 9,180,412 B2 | 11/2015 | Jo et al. |
| 2001/0000485 A1 | 4/2001 | Ying et al. |
| 2001/0053475 A1 | 12/2001 | Ying et al. |
| 2004/0247975 A1 | 12/2004 | Song et al. |
| 2012/0003524 A1 | 1/2012 | Jo et al. |
| 2013/0280584 A1 | 10/2013 | Matsumura |
| 2016/0056438 A1 | 2/2016 | Kim et al. |
| 2018/0212219 A1 * | 7/2018 | Kim .............. H01M 50/411 |

FOREIGN PATENT DOCUMENTS

| | | |
|---|---|---|
| CN | 103035940 A | 4/2013 |
| JP | 2012-069457 A | 4/2012 |
| KR | 10-0403754 B1 | 10/2003 |
| KR | 10-1117126 B1 | 2/2012 |
| KR | 20160043768 A | 10/2014 |
| KR | 10-2015-0084116 A | 7/2015 |
| KR | 10-1594245 B1 | 2/2016 |
| KR | 10-2016-0043768 A | 4/2016 |
| KR | 10-1630208 B1 | 6/2016 |
| KR | 10-2016-0136089 A | 11/2016 |
| KR | 10-2017-0025434 A | 3/2017 |
| WO | 2012/053286 A1 | 4/2012 |
| WO | 2016/053064 A1 | 4/2016 |

OTHER PUBLICATIONS

Cheng et al., "Thermal shutdown behavior of PVdF-HFP based polymer electrolytes comprising heat sensitive cross-linkable oligomers", Journal of Power Sources, 144 (2005) 238-243.

Holtmann et al., "Boehmite-based ceramic separator for lithium-ion batteries", Journal of Applied Electrochemistry (2016), vol. 46, Issue 1, pp. 69-76.

Raja et al., "Thin, flexible and thermally stable ceramic membranes as separator for lithium-ion batteries", Journal of Membrane Science vol. 471, Dec. 1, 2014.

Sohn et al., "A Comparison Study of Polymer-coated PE Separators Prepared Using Electron Beam Irriadiation", Applied Chemistry vol. 13, No. 1 (2009) pp. 1-4.

Xiang et al., "Advanced Separators for Lithium-Ion and Lithium-Sulfur Batteries: A Review of Recent Progress", ChemSUSChem vol. 9, Issue 21, Nov. 9, 2016, pp. 3023-3039.

International Search Report (with partial translation) and Written Opinion dated Apr. 4, 2019, issued in corresponding International Patent Application No. PCT/KR2018/013112.

(Continued)

*Primary Examiner* — Robert S Carrico
(74) *Attorney, Agent, or Firm* — Morgan, Lewis & Bockius LLP (57) ABSTRACT

Disclosed herein is a separator for electrochemical devices, configured to guarantee electrical insulation between a positive electrode and a negative electrode, wherein the separator includes no polyolefin substrate, and includes inorganic particles, a binder for coupling between the inorganic particles, and a crosslinking agent.

12 Claims, 5 Drawing Sheets

(56) References Cited

OTHER PUBLICATIONS

Extended European Search Report issued by the European Patent Office dated Mar. 23, 2020 in a corresponding European patent application No. 18872529.5.

* cited by examiner

SEPARATOR HAVING NO SEPARATOR SUBSTRATE AND ELECTROCHEMICAL DEVICE INCLUDING THE SAME

This application is a divisional of U.S. patent application Ser. No. 16/640,877, which claims the benefit of Korean Patent Application No. 10-2017-0143690 filed on Oct. 31, 2017 and Korean Patent Application No. 10-2018-0131285 filed on Oct. 30, 2018 with the Korean Intellectual Property Office, the disclosure of which is herein incorporated by reference in its entirety.

TECHNICAL FIELD

The present invention relates to a separator having no separator substrate and an electrochemical device including the same, and more particularly to a separator that does not include a polyolefin substrate, which is used as a separator substrate, and includes inorganic particles, a binder for coupling between the inorganic particles, and a crosslinking agent.

BACKGROUND ART

Research into techniques for generating various kinds of power, such as nuclear energy, solar energy, wind energy, and tidal power, is underway. Research into batteries for more efficient use of the energy generated using such techniques is also underway.

With the abrupt growth of markets related to mobile devices, the demand for lithium secondary batteries has increased. Lithium secondary batteries have also come to be used as the power sources for electric vehicles (EV) and hybrid electric vehicles (HEV).

A lithium secondary battery is configured such that an electrode assembly having a positive electrode/separator/negative electrode structure, which can be charged and discharged, is mounted in a battery case. Each of the positive electrode and the negative electrode is manufactured by applying a slurry including an electrode active material to one surface or both surfaces of a metal current collector, drying the slurry, and rolling the metal current collector having the dried slurry applied thereto.

The separator is one of the most important factors that affect the performance and the lifespan of a secondary battery. It is necessary for the separator to electrically isolate the positive electrode and the negative electrode from each other and to exhibit high ion permeability such that an electrolytic solution can pass through the separator. In addition, the separator requires high mechanical strength and high-temperature stability.

A conventional separator including a separator substrate and an inorganic coating layer has a problem in that the force of adhesion between the separator and an electrode is low, whereby the separator and the electrode are locally separated from each other or wrinkles are formed at the interface between the separator and the electrode. Polyolefin, which is used as the separator substrate, has a problem in which polyolefin melts at a high temperature.

In order to fundamentally solve these problems, a new separator including an inorganic coating layer alone without a polyolefin separator substrate has been proposed. However, the new separator has a problem in that the separator exhibits very low electrical insulation, whereby a short circuit easily occurs in a battery. In addition, the separator is easily torn due to the low tensile force and low elongation thereof. As a result, a micro-scale short circuit easily occurs in an electrode assembly.

Patent Document 1 discloses a separator constituted by a micro-porous polymer layer including organically reformed aluminum boehmite and an organic polymer. However, this patent document does not suggest a concrete solution to increase the strength of the separator.

Non-patent Document 1 discloses crosslinking of PVdF-HFP/PEGDMA (polyethylene glycol dimethacrylate) as a method of increasing the strength of the above-mentioned new separator. In Non-patent Document 1, however, the above-specified materials are not applied to the separator but are applied only to a polymer electrolytic solution.

Non-patent Document 2 discloses a separator for lithium secondary batteries, made of boehmite nanoparticles and polyvinylidene fluoride polymer. However, it is noted that this separator is not suitable for a high-stress battery cell.

Non-patent Document 3 discloses a porous ceramic film based on magnesium aluminate as a separator for lithium secondary batteries exhibiting high flexibility and thermal stability. However, this non-patent document does not disclose a concrete method of increasing the strength of the separator.

That is, technology that is capable of providing a separator having no polyolefin substrate, wherein the separator exhibits high stability in a high-temperature environment, high insulation, and improved dimensional stability, thereby solving the above problems, has not yet been suggested.

Prior Art Document (Patent Document 1) U.S. Registered Patent No. 8883354
(Non-patent Document 1) Thermal shutdown behavior of PVdF-HFP-based polymer electrolytes comprising heat sensitive cross linkable oligomers, J. Power Sources 144, 2005
(Non-patent Document 2) Boehmite-based ceramic separator for lithium-ion batteries, Journal of Applied Electrochemistry, 2016, 69
(Non-patent Document 3) Thin, flexible and thermally stable ceramic membranes as separator for lithium-ion batteries, Journal of Membrane Science, 2014, 103

DISCLOSURE

Technical Problem

It is an object of the present invention to provide technology that is capable of preventing the occurrence of a short circuit in a battery due to damage to a separator and a separator to which the technology is applied. It is another object of the present invention to provide a separator having higher tensile strength and elongation than a conventional separator while having insulation corresponding to the insulation of the conventional separator.

Technical Solution

In accordance with an aspect of the present invention, the above and other objects can be accomplished by the provision of an improved separator for electrochemical devices including no polyolefin substrate and including i) inorganic particles and ii) a binder for coupling between the inorganic particles.

The separator according to the present invention may be a separator for electrochemical devices configured to guarantee electrical insulation between a positive electrode and a negative electrode.

The improved separator may include no polyolefin substrate, and may be made of a compound including i) inorganic particles, ii) a binder for coupling between the inorganic particles, and iii) a crosslinking agent.

Compared to a conventional separator, the separator according to the present invention does not include a polyolefin-based separator substrate. The conventional separator includes a polyolefin-based separator substrate, to at least one surface of which an inorganic layer including an inorganic material and a binder is applied. In the present invention, the separator includes no separator substrate, and is made of materials constituting an inorganic layer.

There is a separator including an inorganic layer alone as a separator, similar to the separator according to the present invention. The overall strength of the conventional separator is low, since the separator includes no polyolefin separator substrate. In the case in which an electrode assembly is manufactured using a separator having low strength, the separator may be damaged, whereby a short circuit may occur.

In the present invention, i) a linear polymer having a plurality of branches or ii) a polymer having two or more functional groups, configured to react at a specific temperature to form a three-dimensional net-shaped structure, is used as the crosslinking agent of the separator. The density of the separator is increased due to the characteristics of the net-shaped structure, whereby the physical properties, particularly the rigidity, and the dimensional stability of the separator are improved. Consequently, it is possible to provide a separator having reduced resistance.

In the case in which an initiator is injected, the three-dimensional net-shaped structure becomes more rigid, whereby the tensile strength of the separator is increased while the dimensional stability of the separator is maintained. As a result, the likelihood of damage to the separator is reduced.

In the present invention, it is possible to maximally prevent the occurrence of a micro-scale short circuit in an electrochemical device due to tearing of the separator during the manufacture of the electrochemical device. In addition, swelling of the separator due to an electrolytic solution is reduced, whereby it is possible to prevent the separator from being wrinkled due to the swelling of the separator when the separator is impregnated with the electrolytic solution.

a) Inorganic Particles

In the separator according to the present invention, the inorganic particles may form empty spaces among the inorganic particles, and thereby may form micro pores and maintain a physical shape as a spacer. The physical characteristics of the inorganic particles, which are used in the separator, are not generally changed at a temperature of 200° C. or more.

The inorganic particles are not particularly restricted, as long as the inorganic particles are electrochemically stable. That is, the inorganic particles that can be used in the present invention are not particularly restricted as long as the inorganic particles are not oxidized and/or reduced within the operating voltage range (e.g. 0 to 5 V based on Li/Li+) of a battery to which the inorganic particles are applied. In the case in which inorganic particles having high electrolyte ion transfer ability are used, it is possible to improve the performance of an electrochemical device. Consequently, it is preferable for the electrolyte ion transfer ability of the inorganic particles to be as high as possible. In the case in which the inorganic particles have high density, it may be difficult to disperse the inorganic particles at the time of forming the separator, and the weight of a battery may increase at the time of manufacturing the battery. For these reasons, it is preferable for the density of the inorganic particles to be low. In the case in which the inorganic particles have high permittivity, the degree of dissociation of electrolyte salt, such as lithium salt, in a liquid electrolyte may increase, thereby improving the ion conductivity of the electrolytic solution.

For the reasons described above, the inorganic particles may be high-dielectric inorganic particles having a dielectric constant of 1 or more, preferably 10 or more, inorganic particles having piezoelectricity, inorganic particles having lithium ion transfer ability, alumina hydrate, or a mixture of two or more thereof.

Examples of the inorganic particles having a dielectric constant of 1 or more may include $SrTiO_3$, $SnO_2$, $CeO_2$, $MgO$, $NiO$, $CaO$, $ZnO$, $ZrO_2$, $Y_2O_3$, $Al_2O_3$, $TiO_2$, $SiC$, or a mixture thereof. However, the present invention is not limited thereto.

The inorganic particles having piezoelectricity are a material that is a nonconductor at normal pressure but, when a certain pressure is applied thereto, exhibits conductivity due to a change in the internal structure thereof. The inorganic particles have a high dielectric value, e.g. a dielectric constant of 100 or more. When the inorganic particles are tensioned or compressed with a certain pressure, electric charges are generated. One face is charged as a positive pole and the other face is charged as a negative pole, whereby a potential difference is generated between the two faces.

In the case in which inorganic particles having the above-mentioned characteristics are used, a short circuit may occur in both electrodes in the event of an external impact, such as local crushing or an impact with a nail. At this time, however, the positive electrode and the negative electrode may not directly contact each other due to the inorganic particles coated on the separator, and potential differences in particles may occur due to the piezoelectricity of the inorganic particles. Accordingly, electron migration, namely, fine current flow, is achieved between the two electrodes, whereby the voltage of the battery is gradually reduced, and therefore the stability of the battery may be improved.

Examples of the inorganic particles having piezoelectricity may include $BaTiO_3$, $Pb(Zr,Ti)O_3$ (PZT), $Pb_{1-x}La_xZr_{1-y}Ti_yO_3$ (PLZT), $Pb(Mg_{1/3}Nb_{2/3})O_3$—$PbTiO_3$ (PMN-PT) hafnia ($HfO_2$), and a mixture thereof. However, the present invention is not limited thereto.

The inorganic particles having lithium ion transfer ability are inorganic particles that contain lithium elements and transport lithium ions without storing lithium. The inorganic particles having lithium ion transfer ability may transfer and transport lithium ions due to a kind of defect present in a particle structure. Consequently, lithium ionic conductivity in the battery may be improved, and therefore the battery performance may be improved.

Examples of the inorganic particles having lithium ion transfer ability may include lithium phosphate ($Li_3PO_4$), lithium titanium phosphate ($Li_xTi_y(PO_4)_3$, where $0<x<2$ and $0<y<3$), lithium aluminum titanium phosphate ($Li_xAl_yTi_z(PO_4)_3$, where $0<x<2$, $0<y<1$, and $0<z<3$), $(LiAlTiP)_xO_y$-based glass (where $0<x<4$ and $0<y<13$) such as $14Li_2O$-$9Al_2O_3$-$38TiO_2$-$39P_2O_5$, lithium lanthanum titanate ($Li_xLa_yTiO_3$, where $0<x<2$ and $0<y<3$), lithium germanium thiophosphate ($Li_xGe_yP_zS_w$, where $0<x<4$, $0<y<1$, $0<z<1$, and $0<w<5$) such as $Li_{3.25}Ge_{0.25}P_{0.75}S_4$, lithium nitride ($Li_xN_y$, where $0<x<4$ and $0<y<2$) such as $Li_3N$, $SiS_2$-based glass ($Li_xSi_yS_z$, where $0<x<3$, $0<y<2$, and $0<z<4$) such as $Li_3PO_4$—$Li_2S$—$SiS_2$, $P_2S_5$-based glass ($Li_xP_yS_z$, where $0<x<3$, $0<y<3$, and $0<z<7$) such as $LiI$—$Li_2S$—$P_2S_5$, and a mixture thereof. However, the present invention is not limited thereto.

The alumina hydrate may be classified as crystalline alumina hydrate or gel-type alumina hydrate depending on the method of manufacturing the same. Examples of the crystalline alumina hydrate may include gibbsite γ-$Al(OH)_3$, bayerite $Al(OH)_3$, diaspore γ-AlOOH, and boehmite γ-AlOOH, and the gel-type alumina hydrate may be aluminum hydroxide, which is prepared by depositing an aqueous solution containing aluminum ions using ammonia. Preferably, boehmite γ-AlOOH may be used as the gel-type alumina hydrate.

In the case in which the inorganic particles having high permittivity, the inorganic particles having piezoelectricity, the inorganic particles having lithium ion transfer ability, and the alumina hydrate are used together, the effects obtained through these ingredients may be further improved.

The size of each of the inorganic particles is not particularly restricted. In order to form a film having a uniform thickness and to achieve appropriate porosity, however, each of the inorganic particles may have a size of 0.001 μm to 10 μm. In the case in which the size of each of the inorganic particles is less than 0.001 μm, dispersibility is reduced, whereby it is difficult to adjust the physical properties of the separator. In the case in which the size of each of the inorganic particles is greater than 10 μm, the thickness of a separator manufactured with the same content of a solid body is increased, whereby the mechanical properties of the separator are deteriorated. In addition, a short circuit may easily occur in the battery when the battery is charged and discharged due to excessively large-sized pores.

b) Binder

The binder may become a gel when the binder is impregnated with a liquid electrolytic solution, whereby the binder may have a high rate of electrolytic solution impregnation. For a polymer having a high rate of electrolytic solution impregnation, an electrolytic solution injected after the assembly of a battery permeates into the polymer, and the polymer impregnated with the electrolytic solution exhibits electrolyte ion transfer ability. Compared to a conventional hydrophobic polyolefin-based separator, wetting of the separator in the electrolytic solution may be improved, and it is possible to use polar electrolytic solutions for batteries, which has been difficult conventionally. The binder may have a solubility parameter of 15 $MPa^{1/2}$ to 45 $MPa^{1/2}$, preferably 15 $MPa^{1/2}$ to 25 $MPa^{1/2}$ and 30 $MPa^{1/2}$ to 45 $MPa^{1/2}$. In the case in which the solubility parameter of the binder is less than 15 $MPa^{1/2}$ and greater than 45 $MPa^{1/2}$, it is difficult to impregnate the binder with a general electrolytic solution for batteries.

Specifically, the binder may be at least one selected from the group consisting of polyvinylidene fluoride, polyvinylidene fluoride-hexafluoropropylene, polyvinylidene fluoride-trichloroethylene, polyvinylidene fluoride-chlorotrifluoroethylene, polymethyl methacrylate, polyacrylonitrile, polyvinyl pyrrolidone, polyvinyl acetate, ethylene vinyl acetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, acrylonitrile butadiene styrene copolymer, ethylene-propylene-diene monomer (EPDM), sulfonated EPDM, styrene butadiene rubber (SBR), fluoro rubber, and polyimide.

c) Crosslinking Agent

The crosslinking agent is not particularly restricted as long as the crosslinking agent is a polymer material that performs a crosslinking reaction at a specific temperature to have a three-dimensional net-shaped structure. For example, the crosslinking agent may be a polymer material including 2 to 10 functional groups.

Specifically, the crosslinking agent may be polyethylene glycol dimethacrylate (PEGDMA) or a polymer material represented by Chemical Formula 1 or 2.

Chemical Formula 1

In Chemical Formula 1, x is an integer of 1 to 100, y is an integer of 0 to 30, and z is an integer of 1 to 1,000. The weight average molecular weight of Chemical Formula 1 is 1,000 to 100,000, and p is a variable dependent thereon.

Chemical Formula 2

In Chemical Formula 2, a and c each are an integer of 1 to 30, and b is an integer of 1 to 1,000. The weight average molecular weight of Chemical Formula 2 is 1,000 to 100,000, and d is a variable dependent thereon.

The reaction temperature of the crosslinking agent may be 120° C. to 160° C., preferably 130° C. to 150° C. The crosslinking agent, which has a linear structure at temperatures lower than the above reaction temperature range, reacts when the reaction temperature of the crosslinking agent reaches the above reaction temperature range, whereby a three-dimensional net-shaped structure is formed through crosslinking.

In the case in which the reaction temperature of the crosslinking agent is lower than 120° C., the crosslink joints of the crosslinking agent are not separated from each other, whereby it is difficult for the crosslinking agent to perform a crosslinking reaction, which is undesirable. In the case in which the reaction temperature of the crosslinking agent is higher than 160° C., the crosslinking agent or the binder used together with the crosslinking agent may melt, which is also undesirable.

In addition, since the separator according to the present invention further includes a crosslinking agent in addition to the inorganic particles and the binder, the separator has a high breakdown voltage even though the separator substrate is omitted.

Specifically, in the case in which foreign matter, such as iron (Fe), which is a conductive material, is applied to the separator according to the present invention, the separator has a breakdown voltage value almost the same as the breakdown voltage value of a separator that is used for a secondary battery for vehicles and includes a separator substrate. In addition, there is little difference between the breakdown voltage of the separator before the conductive material is applied and the breakdown voltage of the separator after the conductive material is applied.

d) Initiator

In a concrete example, the separator may further include an initiator for reaction with the crosslinking agent in order to improve the physical properties of the separator through the crosslinking reaction.

The kind of the initiator is not particularly restricted. Specifically, the initiator may be an azo-based compound or a peroxide-based compound. For example, the azo-based compound may be at least one selected from among 2,2'-azobis(2-methylbutyronitrile), 2,2'-azobis(isobutyronitrile), 2,2'-azobis(2,4-dimethylvaleronitrile), and 2,2'-azobis(4-methoxy-2,4-dimethylvaleronitrile). Preferably, the azo-based compound is 2,2'-azobis(isobutyronitrile) or 2,2'-azobis(2,4-dimethylvaleronitrile).

The peroxide-based compound may be at least one selected from among tetramethylbutyl peroxyneodecanoate, bis(4-butylcyclohexyl)peroxydicarbonate, di(2-ethylhexyl) peroxydicarbonate, butyl peroxyneodecanoate, dipropyl peroxydicarbonate, diisopropyl peroxydicarbonate, diethoxyethyl peroxydicarbonate, diethoxyhexyl peroxydicarbonate, hexyl peroxydicarbonate, dimethoxybutyl peroxydicarbonate, bis(3-methoxybutyl)peroxydicarbonate, dibutyl peroxydicarbonate, dicetyl peroxydicarbonate, dimyristyl peroxydicarbonate, 1,1,3,3-tetramethylbutyl peroxypivalate, hexyl peroxypivalate, butyl peroxypivalate, trimethylhexanoyl peroxide, dimethylhydroxybutyl peroxyneodecanoate, amyl peroxyneodecanoate, butyl peroxyneodecanoate, t-butyl peroxyneoheptanoate, amyl peroxypivalate, t-butyl peroxypivalate, t-amyl peroxy-2-ethylhexanoate, lauroyl peroxide, dilauroyl peroxide, didecanoyl peroxide, benzoyl peroxide, and dibenzoyl peroxide.

e) Construction of Separator

Compared to a conventional separator, the separator according to the present invention is configured to have a structure including no separator substrate, whereby the strength of the separator may be low. For this reason, the separator may have a relatively large thickness. The thickness of the separator may range from 5 μm to 30 μm.

In the case in which the thickness of the separator is less than 5 μm, the strength of the separator is low, whereby the separator may be easily damaged, which is undesirable. In the case in which the thickness of the separator is greater than 30 μm, the overall thickness of the electrode assembly is increased, whereby the capacity of the battery may be reduced, which is also undesirable.

The content of the crosslinking agent may be greater than 0 wt % and less than 15 wt % of the total weight of a solid body in the separator. In the case in which the content of the crosslinking agent is greater than 15 wt % of the total weight of the solid body, crosslinking is not completely performed. As a result, the crosslinking agent may serve locally as a plasticizer, and therefore the tensile strength of the separator is rather remarkably reduced, which is undesirable.

The separator may have an air permeability of 50 sec/100 cc to 4,000 sec/100 cc. In the case in which the air permeability of the separator is less than 50 sec/100 cc, the insulation property of the separator is very low, which is undesirable. In the case in which the air permeability of the separator is greater than 4,000 sec/100 cc, the impregnation of the separator with the electrolytic solution and the ion conductivity of the separator become low, which is also undesirable.

The physical properties of the separator are affected by the reaction temperature and the reaction time of a crosslinking reaction. As the reaction temperature and the reaction time are increased, the extent of crosslinking is increased.

For example, for polyethylene glycol dimethacrylate (PEGDMA), which is used as the crosslinking agent, when the reaction time is increased from 10 minutes to 30 minutes and when the reaction temperature is increased from 120° C. to 150° C., the extent of crosslinking is remarkably increased.

f) Electrochemical Device

The present invention also provides an electrochemical device including a positive electrode, a negative electrode, a separator interposed between the positive electrode and the negative electrode, and an electrolyte. Here, the electrochemical device may be a lithium secondary battery.

The positive electrode may be manufactured by applying a mixture of a positive electrode active material, a conductive agent, and a binder to a positive electrode current collector and drying the mixture. A filler may be further added to the mixture as needed.

In general, the positive electrode current collector is manufactured so as to have a thickness of 3 to 500 μm. The positive electrode current collector is not particularly restricted, as long as the positive electrode current collector exhibits high conductivity while the positive electrode current collector does not induce any chemical change in a battery to which the positive electrode current collector is applied. For example, the positive electrode current collector may be made of stainless steel, aluminum, nickel, titanium, or plastic carbon. Alternatively, the positive electrode current collector may be made of aluminum or stainless steel, the surface of which is treated with carbon, nickel, titanium, or silver. In addition, the positive electrode current collector may have a micro-scale uneven pattern formed on the surface thereof so as to increase the force of adhesion of the positive electrode active material. The positive electrode current collector may be configured in various forms, such as those of a film, a sheet, a foil, a net, a porous body, a foam body, and a non-woven fabric body.

The positive electrode active material may be, but is not limited to, a layered compound, such as a lithium cobalt oxide ($LiCoO_2$) or a lithium nickel oxide ($LiNiO_2$), or a compound substituted with one or more transition metals; a lithium manganese oxide represented by the chemical formula $Li_{1+x}Mn_{2-x}O_4$ (where x=0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_8$, $V_2O_5$, or $Cu_2V_2O_7$; an Ni-sited lithium nickel oxide represented by the chemical formula $LiNi_{1-x}M_xO_2$ (where M=Co, Mn, Al, Cu, Fe, Mg, B, or Ga, and x=0.01 to 0.3); a lithium manganese composite oxide represented by the chemical formula $LiMn_{2-x}M_xO_2$ (where M=Co, Ni, Fe, Cr, Zn, or Ta, and x=0.01 to 0.1) or the chemical formula $Li_2Mn_3MO_8$ (where M=Fe, Co, Ni, Cu, or Zn); $LiMn_2O_4$ having Li of a chemical formula partially replaced by alkaline earth metal ions; a disulfide compound; or $Fe_2(MoO_4)_3$.

The conductive agent is generally added so that the conductive agent accounts for 1 to 30 wt % based on the total weight of the mixture including the positive electrode active material. The conductive agent is not particularly restricted, as long as the conductive agent exhibits high conductivity without inducing any chemical change in a battery to which the conductive agent is applied. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as a zinc oxide or potassium titanate; a conductive metal oxide, such as a titanium oxide; or conductive materials, such as polyphenylene derivatives, may be used as the conductive agent.

The binder is a component assisting in binding between the active material and the conductive agent and in binding with the current collector. The binder is generally added in an amount of 1 to 30 wt % based on the total weight of the mixture including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrrolidone, polyethylene, polypropylene, ethylene-propylene-diene monomer (EPDM), sulfonated EPDM, styrene butadiene rubber, fluoro rubber, and various copolymers.

The filler is an optional component used to inhibit expansion of the positive electrode. There is no particular limit to the filler, as long as it does not cause chemical changes in a battery to which the filler is applied and is made of a fibrous material. As examples of the filler, there may be used olefin polymers, such as polyethylene and polypropylene; and fibrous materials, such as glass fiber and carbon fiber.

The negative electrode may be manufactured by applying a negative electrode material to a negative electrode current collector and drying the same. The above-described components may be selectively further included as needed.

In general, the negative electrode current collector is manufactured so as to have a thickness of 3 μm to 500 μm. The negative electrode current collector is not particularly restricted, as long as the negative electrode current collector exhibits high conductivity while the negative electrode current collector does not induce any chemical change in a battery to which the negative electrode current collector is applied. For example, the negative electrode current collector may be made of copper, stainless steel, aluminum, nickel, titanium, or plastic carbon. Alternatively, the negative electrode current collector may be made of copper or stainless steel, the surface of which is treated with carbon, nickel, titanium, or silver, or an aluminum-cadmium alloy. In addition, the negative electrode current collector may have a micro-scale uneven pattern formed on the surface thereof so as to increase the force of adhesion of the negative electrode active material, in the same manner as the positive electrode current collector. The negative electrode current collector may be configured in various forms, such as those of a film, a sheet, a foil, a net, a porous body, a foam body, and a non-woven fabric body.

As the negative electrode active material, for example, there may be used carbon, such as a hard carbon or a graphite-based carbon; a metal composite oxide, such as $Li_xFe_2O_3$ ($0 \le x \le 1$), $Li_xWO_2$ ($0 \le x \le 1$), $Sn_xMe_{1-x}Me'_yO_z$ (Me: Mn, Fe, Pb, Ge; Me': Al, B, P, Si, Group 1, 2 and 3 elements of the periodic table, halogen; $0<x\le1$; $1\le y\le3$; $1\le z\le8$); lithium metal; lithium alloy; silicon-based alloy; tin-based alloy; a metal oxide, such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, or $Bi_2O_5$; a conductive polymer, such as polyacetylene; or a Li—Co—Ni based material.

In accordance with another aspect of the present invention, there is provided a battery pack including the electrochemical device.

Specifically, the battery pack may be used as a power source for a device requiring the ability to withstand high temperatures, a long lifespan, high rate characteristics, etc. Specific examples of the device may include a mobile electronic device, a wearable electronic device, a power tool driven by a battery-powered motor, an electric automobile, such as an electric vehicle (EV), a hybrid electric vehicle (HEV), or a plug-in hybrid electric vehicle (PHEV), an electric two-wheeled vehicle, such as an electric bicycle (E-bike) or an electric scooter (E-scooter), an electric golf cart, and a power storage system. However, the present invention is not limited thereto.

The structure and manufacturing method of the device are well known in the art to which the present invention pertains, and a detailed description thereof will be omitted.

Best Model

Hereinafter, the present invention will be described with reference to the following examples. These examples are provided only for illustration of the present invention and should not be construed as limiting the scope of the present invention.

Concrete methods of measuring the physical properties of separators manufactured according to the following examples are as follows.

Measurement of Volumetric Resistivity 10 separators, each of which was cut to a size of 6 cm×6 cm, were prepared, the separators were stored in a dry room, and then the volumetric resistivity of the separators was measured.

SM 7120 from HIOKI Company was used in order to measure volumetric resistivity, and volumetric resistivity was measured in an Rv mode. Volumetric resistivity was measured with respect to the 10 separators, and the average volumetric resistivity values were calculated. The values shown in Table 1 are average values.

Concrete measurement conditions were as follows.
Measurement time: 3 S
Average: off
Voltage: 100 V
Speed: slow 2
Range: auto
Delay: 0 ms
SEQ: ON: 0
DCHG 1: 0
CHG: 0
DCHG 2: 0

Measurement of Tensile Strength and Elongation 6 separators, each of which was cut to a size of 15 mm×150 mm, were prepared, and then each of the separators was adhered to a slide glass so as to be aligned in the minor-axis direction and the major-axis direction of the slide glass.

One end of the separator, which was located on the slide glass, and the other end of the separator, which was not adhered to the slide glass, were connected to a universal testing machine (UTM), and then the two ends of the separator were pulled in opposite directions in order to measure the rupture strength of the separator. At this time, the measurement speed of the UTM was 500 mm/min, and the length of a measurement unit of the UTM was 100 mm.

Experiments were performed with respect to each of the 6 separators, and then the average values of tensile strength and elongation were calculated. The values shown in Table 1 are average values.

Measurement of Swelling 6 separators, each of which was cut to a size of 10 cm×10 cm, and an electrolytic solution, including ethylene carbonate/ethyl methyl carbonate/dimethyl carbonate at a ratio of 3:3:4 and including 1.0 M of $LiPF_6$ as lithium salt, were prepared.

The separators were impregnated with 10 ml of the electrolytic solution for 1 hour, and the changed length of each of the separators was measured in order to calculate swelling of the separators. Experiments were performed with respect to each of the 6 separators, and then the average values of swelling were calculated. The values shown in Table 1 are average values.

Measurement of Electrical Resistance 2016-sized coin cells, each including a separator and an electrolytic solution excluding an electrode, were manufactured.

The impedance of the coin cells at a specific frequency range from 10,000 Hz to 100,000 Hz was measured using a Cell Test System 1470E from Solatron Company and a Frequency Response Analyzer 1255B from Solatron Company, and an X intercept formed when respective impedance values are connected in a line was taken as the resistance of each of the separators.

Example 1

A slurry was manufactured such that the content of a solid body including boehmite (AlO(OH)), as inorganic particles, polyvinylidene fluoride (PVdF), as a binder, and polyethylene glycol dimethacrylate (PEGDMA), as a crosslinking agent, mixed in a weight ratio of 78:20:2, became 18 wt % of the total weight of the slurry.

Specifically, 28.08 g of boehmite (AlO(OH)), 7.2 g of PVdF, and 0.72 g of PEGDMA were added to 164 g of acetone in order to manufacture a slurry. The slurry was formed so as to have the shape of a separator, and then a crosslinking reaction was performed at 150° C. for 30 minutes in order to manufacture a separator. After the crosslinking reaction, the separator was further dried at ambient temperature in order to complete the separator.

Example 2

A separator was manufactured using the same method as in Example 1, except that 0.0072 g of 2,2'-azobis(isobutyronitrile), as an initiator, was added to the slurry manufactured according to Example 1.

Comparative Example 1

A separator was manufactured using the same method as in Example 1, except that a solid body including boehmite (AlO(OH)) and polyvinylidene fluoride (PVdF), mixed at a ratio of 78:22, was used without polyethylene glycol dimethacrylate (PEGDMA), as a crosslinking agent.

Experimental Example 1

Figure 1A:
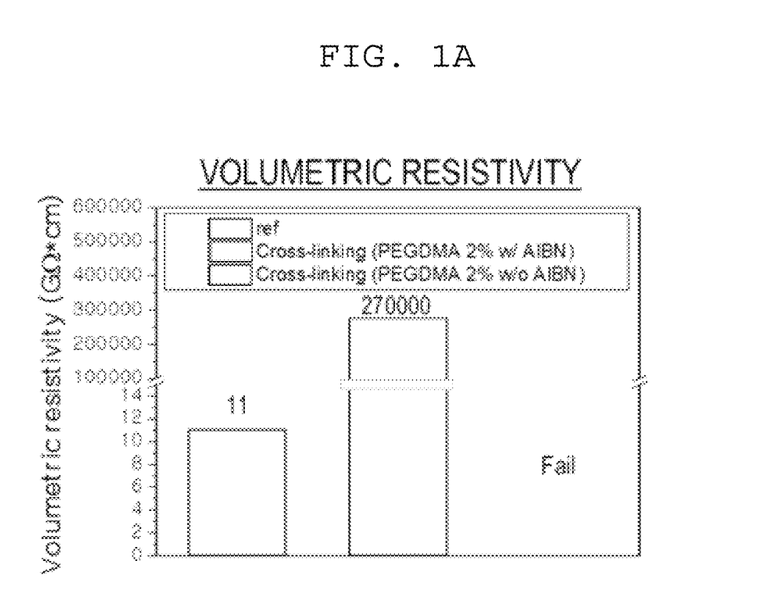
FIGS. 1A-1E are graphs showing the results of measurement of the physical properties of separators depending on whether a crosslinking agent and an initiator are present.
Figure 1B:
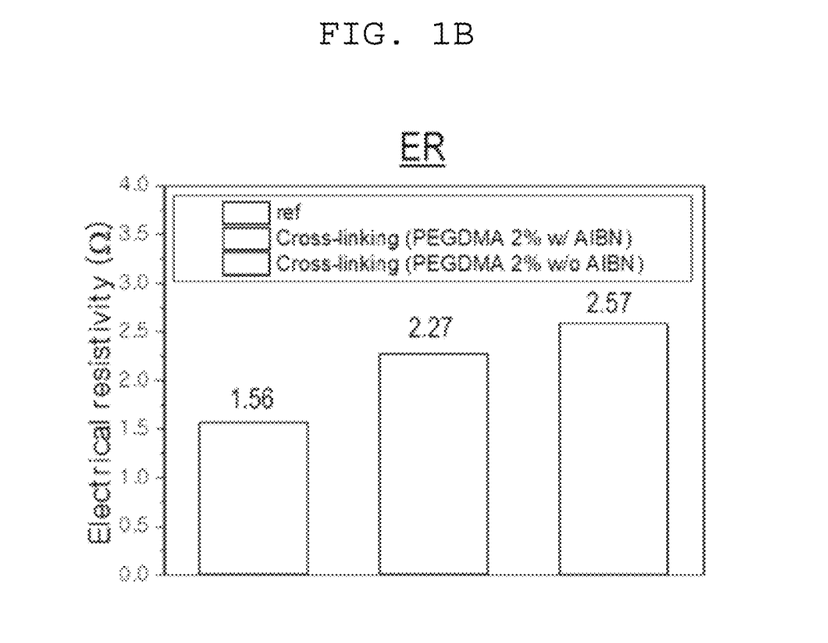
Figure 1C:
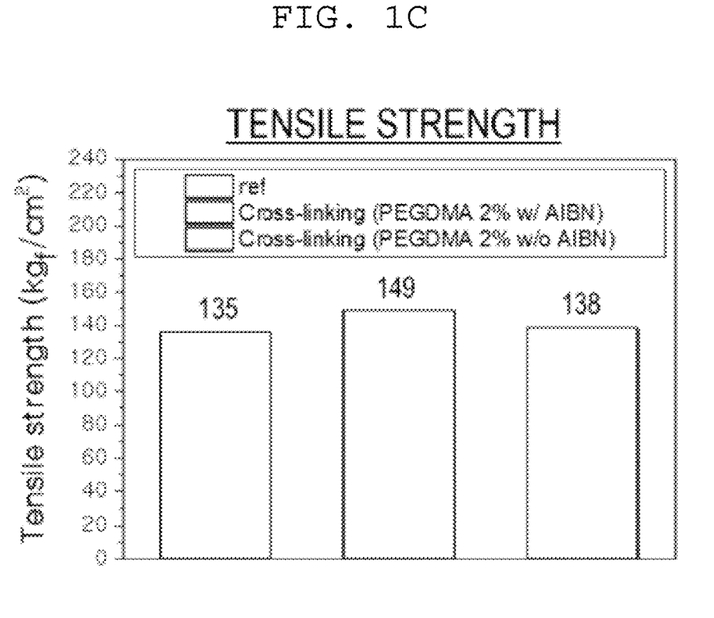
Figure 1D:
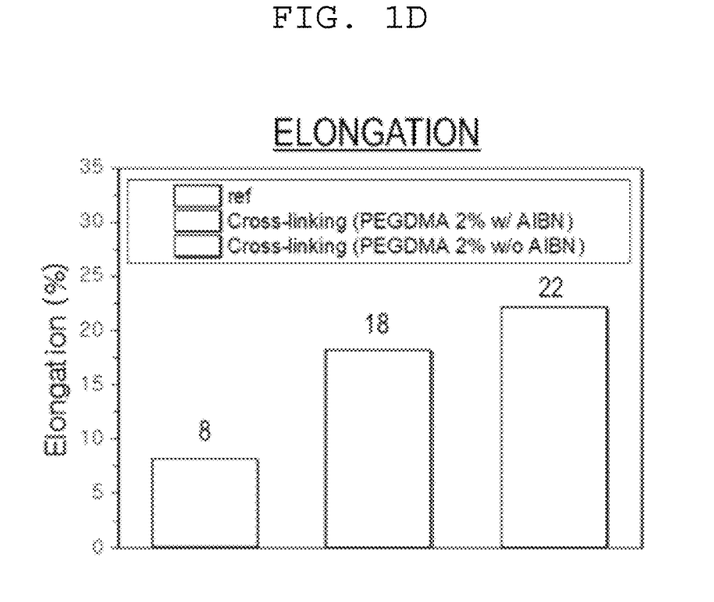
Figure 1E:
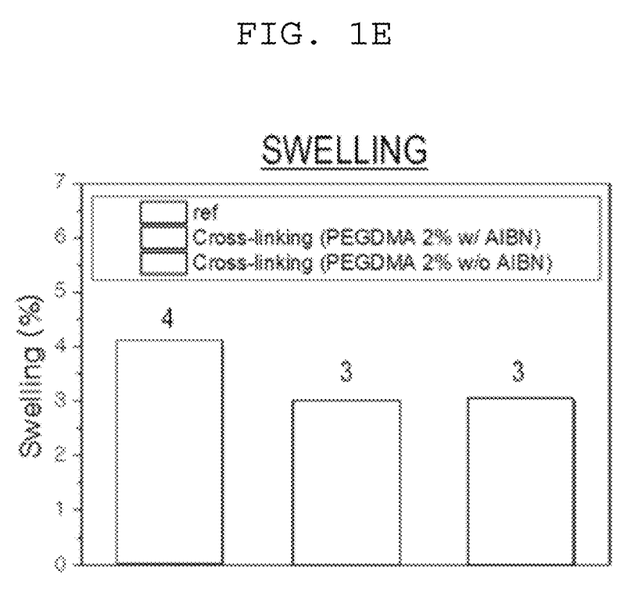

Measurement of the Physical Properties of the Separators Depending on Whether the Crosslinking Agent and the Initiator are Present The volumetric resistivity, the tensile strength, and the swelling of the separators manufactured according to Examples 1 and 2 and Comparative Example 1 were measured. The results of measurement are shown in Table 1 and in FIG. 1.

TABLE 1

|  | Example 1 | Example 2 | Comparative Example 1 |
|---|---|---|---|
| Volumetric resistivity (GΩ · cm) (100 V, 3 S) | 4.2 | 270,000 | 11 |
| Tensile strength (kgf/cm$^2$) | 138 | 149 | 135 |
| Swelling (%) | 3 | 3 | 4 |

Referring to Table 1 and FIG. 1, the volumetric resistivity of the separator manufactured according to Example 1, in which no initiator was added, was 4.2 GΩ·cm, which is low, whereas the volumetric resistivity of the separator manufactured according to Example 2, in which the initiator was added, was remarkably higher than the volumetric resistivity of the separator manufactured according to Comparative Example 1, in which no crosslinking agent was included. In the case in which the volumetric resistivity of the separator is low, the separator is not sufficiently insulated, whereby micro-current flows in the separator. In contrast, in the case in which the volumetric resistivity of the separator is high, the separator is insulated, whereby no current flows in the separator. Therefore, it can be seen that, in the case in which the initiator is added, insulation is remarkably improved. In the case in which the initiator is added, the crosslink density of the separator is increased, whereby the content of the crosslinking agent that does not react is reduced and the rate of reaction of the polymer due to the crosslinking agent is increased, compared to the case in which no initiator is added. Therefore, it is supposed that, when the initiator is added, the volumetric resistivity of the separator is improved.

Also, in the case of Examples 1 and 2, in which the crosslinking agent, configured to be changed so as to have a three-dimensional net-shaped structure, was included, the tensile strength of each of the separators was increased, whereby the rigidity of each of the separators was improved, and the swelling of each of the separators was reduced, whereby the dimensional stability of each of the separators was improved.

That is, in the case in which a crosslinking agent, such as PEGDMA, is added in order to manufacture a separator, a three-dimensional net-shaped structure is formed based on cross linking through a drying step performed at 150° C. Consequently, it can be seen that the tensile strength of the separator is increased and that the swelling of the separator is reduced.

In addition, when comparing Example 1, in which no initiator was added, and Example 2, in which the initiator was added, the tensile strength of the separator manufactured according to Example 2 was higher than the tensile strength of the separator manufactured according to Example 1. Consequently, it can be seen that the initiator is effective in cross linking for forming the three-dimensional net-shaped structure.

Example 3

A separator was manufactured using the same method as in Example 1, except that the reaction temperature was changed from 150° C. to 130° C.

Comparative Example 2

A separator was manufactured using the same method as in Example 1, except that the reaction temperature of the slurry was 100° C.

Comparative Example 3

A separator was manufactured using the same method as in Example 1, except that the reaction temperature of the slurry was 170° C.

Experimental Example 2

Figure 2A:
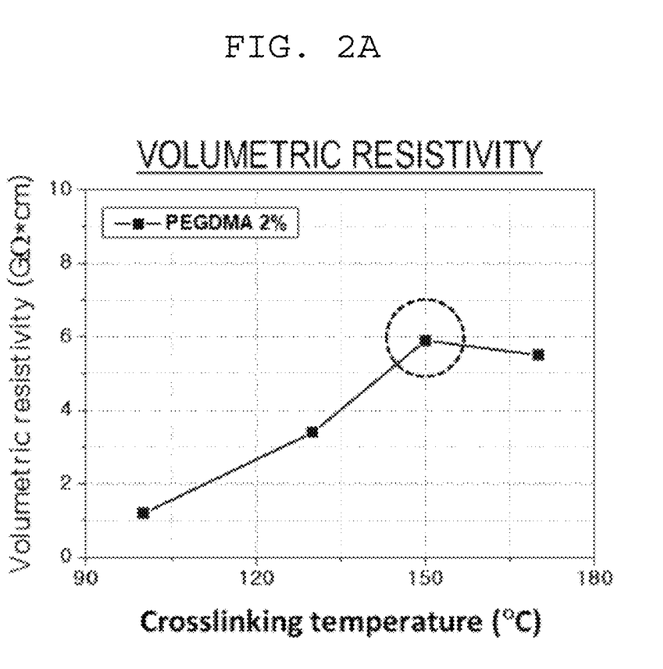
FIGS. 2A-2E are graphs showing the results of measurement of the physical properties of the separators depending on the reaction temperature of the crosslinking agent.
Figure 2B:
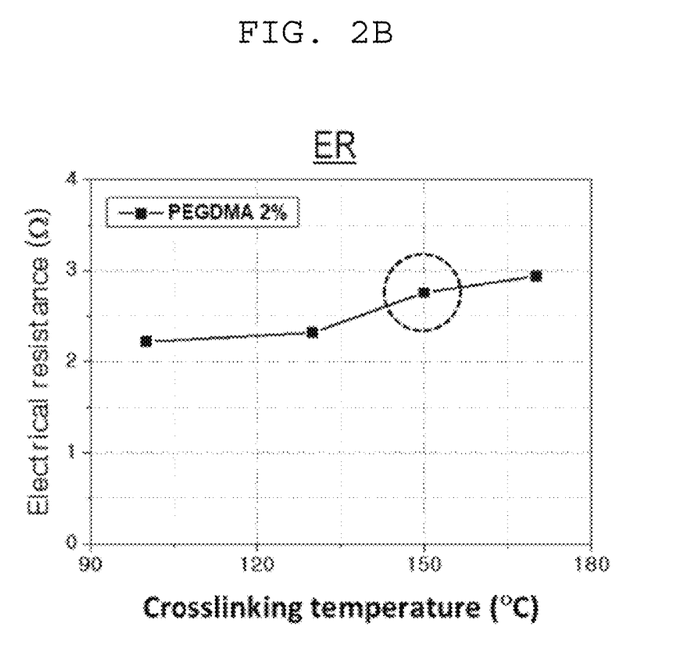
Figure 2C:
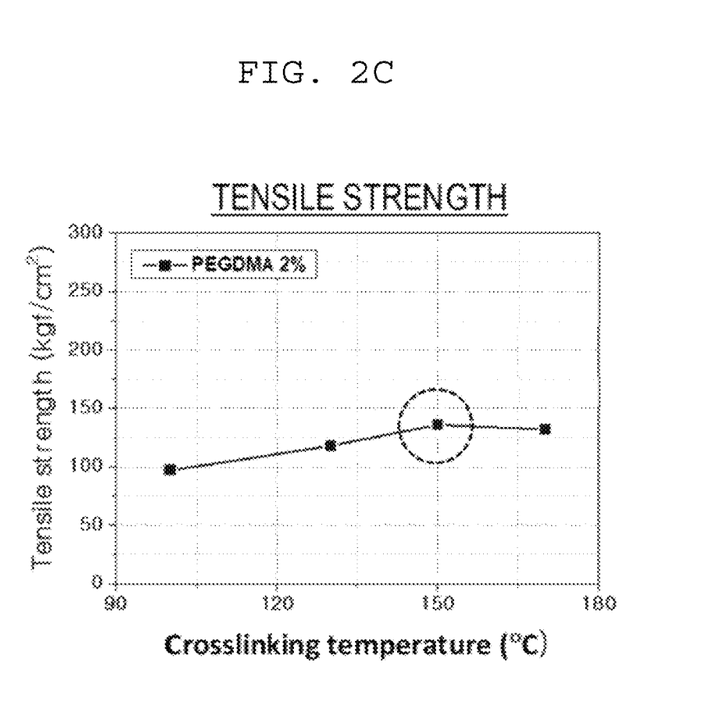
Figure 2D:
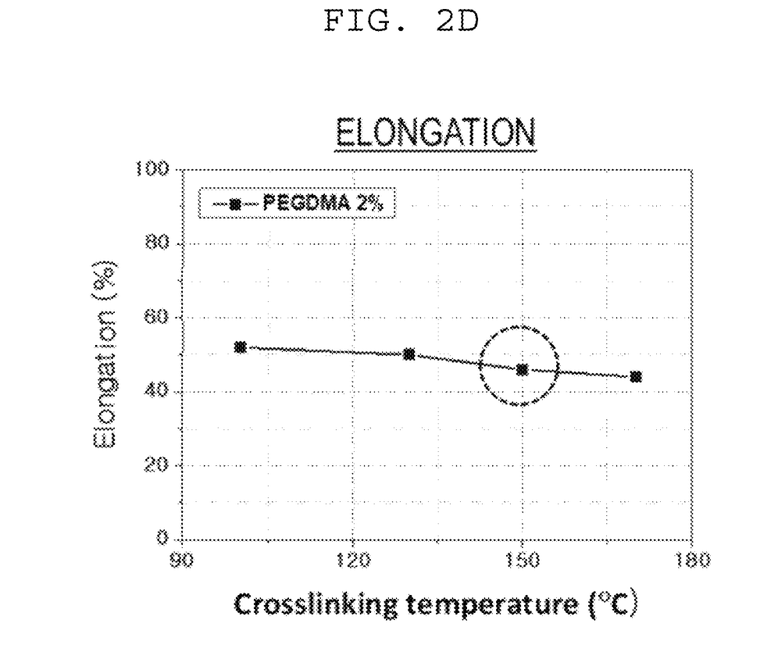
Figure 2E:
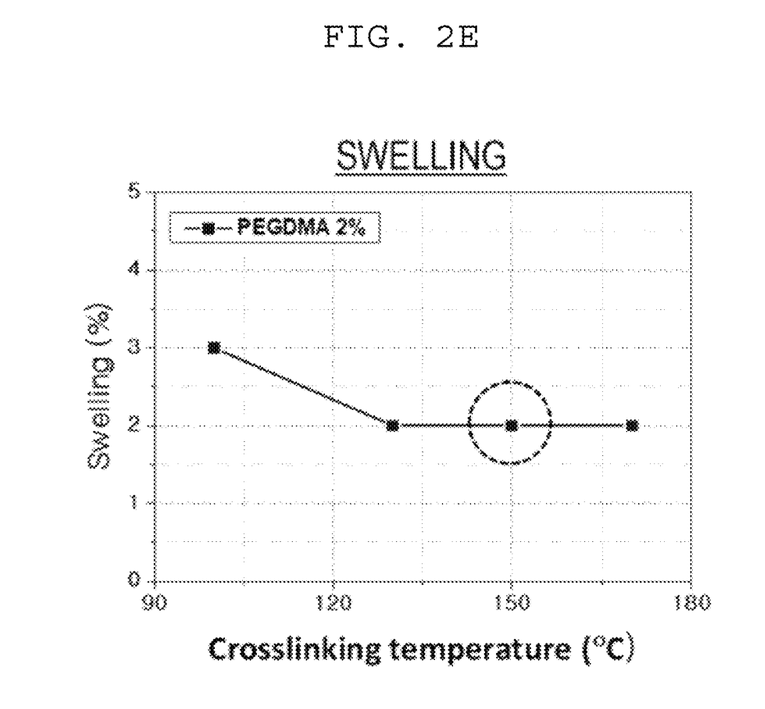

Measurement of the Physical Properties of the Separators Depending on the Reaction Temperature of the Crosslinking Agent The volumetric resistivity, the tensile strength, and the swelling of the separators manufactured according to Example 1, Example 3, Comparative Example 2, and Comparative Example 3 were measured. The results of measurement are shown in Table 2 and in FIG. 2.

TABLE 2

|  | Comparative Example 2 (100° C.) | Example 3 (130° C.) | Example 1 (150° C.) | Comparative Example 3 (170° C.) |
|---|---|---|---|---|
| Volumetric resistivity (GΩ · cm) (100 V, 3 S) | 1.20 | 3.43 | 5.91 | 5.50 |
| Tensile strength (kgf/cm$^2$) | 97 | 118 | 136 | 132 |
| Swelling (%) | 3 | 2 | 2 | 2 |

Referring to Table 2 and FIG. 2, when comparing the physical properties of the separator manufactured according to Example 1, in which the crosslinking temperature was 150° C., and the physical properties of the separator manufactured according to Example 3, in which the crosslinking temperature was 130° C., the volumetric resistivity and the tensile strength of the separator manufactured according to Example 1 were higher than the volumetric resistivity and the tensile strength of the separator manufactured according to Example 3. In addition, it can be seen that the swelling of the separator manufactured according to Example 1 and the swelling of the separator manufactured according to Example 3 were the same.

In addition, when comparing the physical properties of the separator manufactured according to Comparative Example 2, in which the crosslinking temperature was 100° C., and the physical properties of the separator manufactured according to Example 3, in which the crosslinking temperature was 130° C., the volumetric resistivity, the tensile strength, and the swelling of the separator manufactured according to Comparative Example 2 were lower than the volumetric resistivity, the tensile strength, and the swelling of the separator manufactured according to Example 3.

When comparing the physical properties of the separator manufactured according to Comparative Example 3, in which the crosslinking temperature was 170° C., and the physical properties of the separator manufactured according to Example 1, the swelling of the separator manufactured according to Comparative Example 3 and the swelling of the separator manufactured according to Example 1 were the same, but the volumetric resistivity and the tensile strength of the separator manufactured according to Comparative Example 3 were poorer than the volumetric resistivity and the tensile strength of the separator manufactured according to Example 1.

Therefore, it can be seen that the crosslinking agent according to the present invention actively performs a crosslinking reaction within a temperature range of 120° C. to 160° C., whereby it is possible to manufacture a separator having desired physical properties and that, in the case in which the crosslinking temperature is 150° C., it is possible to manufacture a separator having the best physical properties.

Example 4

A separator was manufactured using the same method as in Example 1, except that the content ratio of the binder to the total weight of the solid body was changed from 20 wt % to 15 wt % and that the content ratio of the crosslinking agent to the total weight of the solid body was changed from 2 wt % to 7 wt %.

Example 5

A separator was manufactured using the same method as in Example 1, except that the content ratio of the binder to the total weight of the solid body was changed from 20 wt % to 11 wt % and that the content ratio of the crosslinking agent to the total weight of the solid body was changed from 2 wt % to 11 wt %.

Comparative Example 4

A separator was manufactured using the same method as in Example 1, except that the content ratio of the binder to the total weight of the solid body was changed from 20 wt % to 7 wt % and that the content ratio of the crosslinking agent to the total weight of the solid body was changed from 2 wt % to 15 wt %.

Experimental Example 3

Measurement of the Physical Properties of the Separators Depending on the Content of the Crosslinking Agent The tensile strength and the elongation of the separators manufactured according to Example 1, Example 4, Example 5, and Comparative Example 4 were measured. The results of measurement are shown in Table 3.

TABLE 3

|  | Example 1 (PEGDMA 2 wt %) | Example 4 (PEGDMA 7 wt %) | Example 5 (PEGDMA 11 wt %) | Comparative Example 4 (PEGDMA 15 wt %) |
|---|---|---|---|---|
| Tensile strength (kgf/cm$^2$) | 136 | 88 | 79 | 10 |
| Elongation (%) | 46 | 41 | 15 | 3 |

Referring to Table 3, the tensile strength and the elongation of the separators manufactured according to Examples 1, 4, and 5, in which less than 15 wt % of the crosslinking agent was added, were higher than the tensile strength and the elongation of the separator manufactured according to Comparative Example 4, in which 15 wt % of the crosslinking agent was added.

That is, it can be seen that, in the case in which an excessive amount of the crosslinking agent is added, the tensile strength is greatly reduced.

Therefore, it can be seen from the present invention that appropriate tensile strength and elongation are maintained only in the case in which the content of the crosslinking agent is increased within a predetermined range, whereby it is possible to manufacture a separator that enables the assembly of a cell.

Example 7

A separator was manufactured using the same method as in Example 2, except that a compound having six functional groups represented by Chemical Formula 1 was used as the crosslinking agent in place of polyethylene glycol dimethacrylate (PEGDMA) and that 2,2'-azobis(2,4-dimethylvaleronitrile) was used as the initiator in place of 2,2'-azobis (isobutyronitrile).

Example 8

A separator was manufactured using the same method as in Example 2, except that a compound having ten functional groups represented by Chemical Formula 2 was used as the crosslinking agent in place of polyethylene glycol dimethacrylate (PEGDMA) and that 2,2'-azobis(2,4-dimethylvaleronitrile) was used as the initiator in place of 2,2'-azobis (isobutyronitrile).

Experimental Example 4

Measurement of the Physical Properties of the Separators Depending on the Number of Functional Groups of the Crosslinking Agent and the Content of the Crosslinking Agent The volumetric resistivity, the electrical resistance, the tensile strength, and the swelling of the separators manufactured according to Example 2, Example 7, and Example 8 were measured. The results of measurement are shown in Table 4.

TABLE 4

| | Number of functional groups of crosslinking agent | Volumetric resistivity (TΩ · cm, 100 V, 3 S, 6 × 6 cm) | Electrical resistance (Ω) | tensile strength (kgf/cm²) | Swelling (%) |
|---|---|---|---|---|---|
| Example 2 (crosslinking agent 2 wt %) | 2 | 21.5 | 1.96 | 147 | 3 |
| Example 7 (crosslinking agent 2 wt %) | 6 | 54 | 1.76 | 170 | 2.5 |
| Example 8 (crosslinking agent 2 wt %) | 10 | 53.4 | 1.98 | 179 | 2.3 |

Referring to Table 4, it can be seen that the volumetric resistivity of the separators manufactured according to Example 7, in which the number of functional groups of the crosslinking agent was 6, and Example 8, in which the number of functional groups of the crosslinking agent was 10, was higher than the volumetric resistivity of the separators manufactured according to Example 2, in which the number of functional groups of the crosslinking agent was 2. The reason for this is predicted to be that much more cross linking occurred.

The tensile strength of the separators was increased as the number of functional groups of the crosslinking agent was increased.

In the case in which the separators had the same content of the crosslinking agent, the swelling of the separators was decreased as the number of functional groups of the crosslinking agent was increased, whereby the dimensional stability of the separators was increased.

As described above, the separator according to the present invention includes no polyolefin substrate, includes a crosslinking agent as a component constituting the separator, and selectively includes an initiator. The crosslinking agent has 2 to 10 functional groups. The volumetric resistivity of the separator is remarkably increased due to the crosslinking agent and the initiator, whereby the insulation and the dimensional stability of the separator are improved.

Those skilled in the art to which the present invention pertains will appreciate that various applications and modifications are possible based on the above description, without departing from the scope of the present invention.

INDUSTRIAL APPLICABILITY

As is apparent from the above description, a separator for electrochemical devices according to the present invention does not include a polyolefin substrate, which is used as a separator substrate of a conventional separator, and is made of a material including inorganic particles, a binder, and a crosslinking agent. Consequently, it is possible to solve a problem in which the thermal stability of the separator substrate is low. Furthermore, the crosslinking agent compound forms a three-dimensional net-shaped structure, whereby it is possible to remarkably improve the insulation of the separator.

In addition, since the crosslinking agent is changed from a linear structure to a three-dimensional net-shaped structure, the tensile strength of the separator is increased, whereby the likelihood of damage to the separator is reduced. Consequently, it is possible to prevent a short circuit in a battery. In addition, the dimensional stability of the separator is improved as the number of functional groups of the crosslinking agent is increased, whereby it is possible to prevent the separator from being wrinkled or deformed.

The invention claimed is:

1. A separator for electrochemical devices, configured to provide electrical insulation between a positive electrode and a negative electrode, wherein
the separator comprises no polyolefin substrate, and comprises inorganic particles, a binder for coupling between the inorganic particles, and a crosslinking agent,
wherein the crosslinking agent is a polymer material represented by Formula 1 having a weight average molecular weight of 1,000 to 100,000:

(Formula 1)

wherein in the Formula 1, x is an integer of 1 to 100, y is an integer of 0 to 30, z is an integer of 1 to 1,000, and p is an integer which varies depending on the weight average molecular weight.

2. The separator according to claim 1, wherein the inorganic particles are high-dielectric inorganic particles having a dielectric constant of 1 or more, inorganic particles having piezoelectricity, inorganic particles having lithium ion transfer ability, alumina hydrate, or a mixture of two or more thereof.

3. The separator according to claim 1, wherein the binder is at least one selected from a group consisting of polyvinylidene fluoride, polyvinylidene fluoride-hexafluoropropylene, polyvinylidene fluoride-trichloroethylene, polyvinylidene fluoride-chlorotrifluoroethylene, polymethyl methacrylate, polyacrylonitrile, polyvinyl pyrrolidone, polyvinyl acetate, ethylene vinyl acetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, acrylonitrile butadiene styrene copolymer, ethylene-propylene-diene monomer (EPDM), sulfonated EPDM, styrene butadiene rubber (SBR), fluoro rubber, and polyimide.

4. The separator according to claim 1, wherein a reaction temperature of a crosslinking reaction of the crosslinking agent is 120° C. to 160° C.

5. The separator according to claim 1, wherein the separator further comprises an initiator for a crosslinking reaction with the crosslinking agent.

6. The separator according to claim 5, wherein the initiator is an azo-based compound or a peroxide-based compound.

7. The separator according to claim 6, wherein the azo-based compound is at least one selected from among 2,2'-azobis(2-methylbutyronitrile), 2,2'-azobis(isobutyronitrile), 2,2'-azobis(2,4-dimethylvaleronitrile), and 2,2'-azobis(4-methoxy-2,4-dimethylvaleronitrile).

8. The separator according to claim 7, wherein the azo-based compound is 2,2'-azobis(isobutyronitrile) or 2,2'-azobis(2,4-dimethylvaleronitrile).

9. The separator according to claim 6, wherein the peroxide-based compound is at least one selected from among tetramethylbutyl peroxyneodecanoate, bis(4-butylcyclohexyl) peroxydicarbonate, di(2-ethylhexyl) peroxydicarbonate, butyl peroxyneodecanoate, dipropyl peroxydicarbonate, diisopropyl peroxydicarbonate, diethoxyethyl peroxydicarbonate, diethoxyhexyl peroxydicarbonate, hexyl peroxydicarbonate, dimethoxybutyl peroxydicarbonate, bis(3-methoxybutyl) peroxydicarbonate, dibutyl peroxydicarbonate, dicetyl peroxydicarbonate, dimyristyl peroxydicarbonate, 1,1,3,3-tetramethylbutyl peroxypivalate, hexyl peroxypivalate, butyl peroxypivalate, trimethylhexanoyl peroxide, dimethylhydroxybutyl peroxyneodecanoate, amyl peroxyneodecanoate, butyl peroxyneodecanoate, t-butyl peroxyneoheptanoate, amyl peroxypivalate, t-butyl peroxypivalate, t-amyl peroxy-2-ethylhexanoate, lauroyl peroxide, dilauroyl peroxide, didecanoyl peroxide, benzoyl peroxide, and dibenzoyl peroxide.

10. The separator according to claim 1, wherein a content of the crosslinking agent is greater than 0 wt % and equal to or less than 15 wt % of a total weight of a solid body in the separator.

11. An electrochemical device comprising the separator according to claim 1.

12. The separator according to claim 1, wherein the inorganic particles comprise alumina hydrate, wherein the alumina hydrate is selected from gibbsite γ-Al(OH)$_3$, bayerite Al(OH)$_3$, diaspore α-AlOOH, and boehmite γ-AlOOH.

* * * * *